(12) United States Patent
Busse

(10) Patent No.: US 8,253,019 B2
(45) Date of Patent: Aug. 28, 2012

(54) CABLE ROUTING DEVICE AND UNIT FOR TELECOMMUNICATION AND DATA TECHNOLOGY

(75) Inventor: Ralf-Dieter Busse, Hoppegarten (DE)

(73) Assignee: ADC GmbH, Berlin (DE)

( * ) Notice: Subject to any disclaimer, the term of this patent is extended or adjusted under 35 U.S.C. 154(b) by 3 days.

(21) Appl. No.: 12/674,251

(22) PCT Filed: Jul. 23, 2008

(86) PCT No.: PCT/EP2008/006029
§ 371 (c)(1),
(2), (4) Date: Feb. 19, 2010

(87) PCT Pub. No.: WO2009/024236
PCT Pub. Date: Feb. 26, 2009

(65) Prior Publication Data
US 2012/0000688 A1    Jan. 5, 2012

(30) Foreign Application Priority Data

Aug. 21, 2007   (DE) .................... 10 2007 039 353

(51) Int. Cl.
*H02G 3/04* (2006.01)
(52) U.S. Cl. ......... 174/68.1; 174/59; 174/101; 439/713; 248/68.1; 361/826
(58) Field of Classification Search .......... 174/101, 174/59, 68.1, 135; 248/49, 68.1; 211/26; 379/438; 439/713, 49; 361/826
See application file for complete search history.

(56) References Cited

U.S. PATENT DOCUMENTS

| | | | |
|---|---|---|---|
| 5,731,546 A * | 3/1998 | Miles et al. | 174/135 |
| 5,836,786 A | 11/1998 | Pepe | |
| 5,918,837 A * | 7/1999 | Vicain | 248/49 |
| 6,285,565 B1 * | 9/2001 | øberg et al. | 361/826 |
| 6,347,715 B1 | 2/2002 | Drozdenko et al. | |
| 6,568,542 B1 | 5/2003 | Chen | |
| 6,600,106 B2 | 7/2003 | Standish et al. | |
| 6,679,722 B1 * | 1/2004 | Pulizzi | 439/451 |
| 6,686,541 B2 * | 2/2004 | Chan | 174/72 A |
| 7,091,418 B1 | 8/2006 | Clark et al. | |
| 7,357,677 B2 | 4/2008 | Liu | |
| 7,534,958 B2 * | 5/2009 | McNutt et al. | 174/68.1 |
| 2005/0215112 A1 | 9/2005 | Barker et al. | |

FOREIGN PATENT DOCUMENTS

| | | |
|---|---|---|
| CA | 2 574 751 | 7/2007 |
| CH | 665 318 | 4/1988 |
| DE | 195 46 779 | 12/1995 |
| DE | 201 05 478 | 8/2001 |
| EP | 1 603 345 | 12/2005 |
| EP | 1 681 752 | 7/2006 |

* cited by examiner

*Primary Examiner* — Dhirubhai R Patel
(74) *Attorney, Agent, or Firm* — Merchant & Gould P.C.

(57) ABSTRACT

A cable routing device and a unit for telecommunication and data technology including a housing, wherein terminals or circuit board plug-in connectors (2) are disposed on at least one side of the housing. A cable routing device (10) is disposed on the housing, the cable routing device (10) being configured as a carrier element having attachment means for attaching the cable routing device (10) to the unit. Cable routing elements are attached to the carrier element.

14 Claims, 3 Drawing Sheets

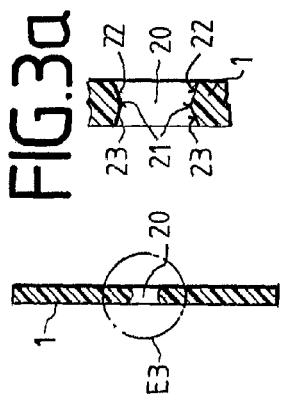
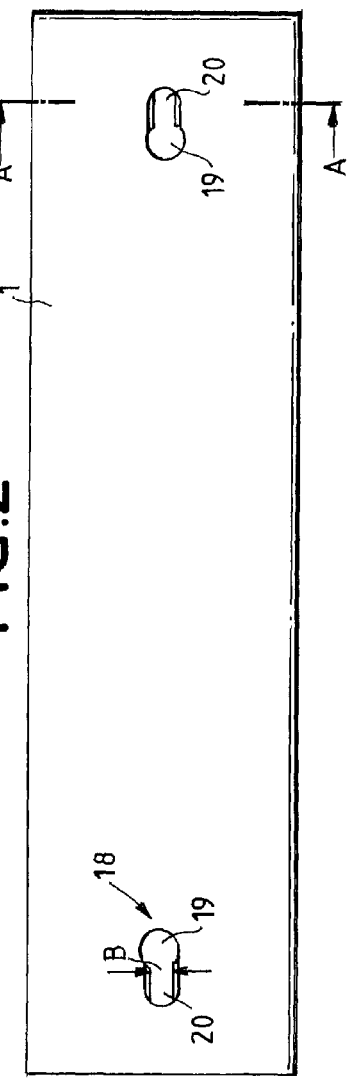
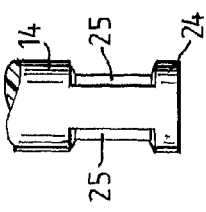
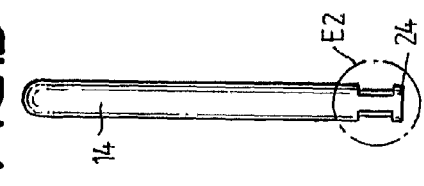

FIG.6 B-B
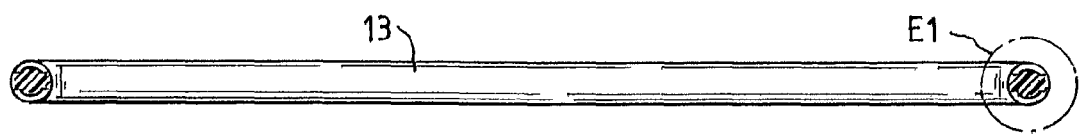
FIG.6a
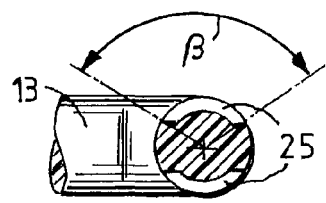
FIG.7
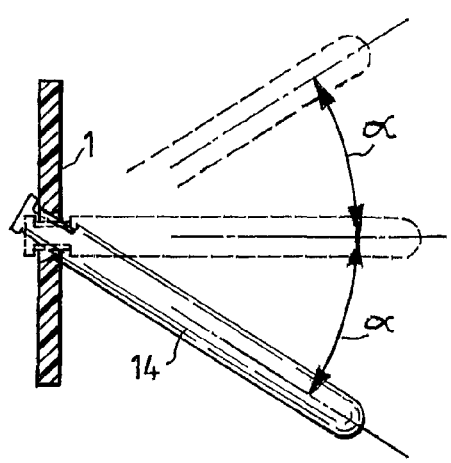

CABLE ROUTING DEVICE AND UNIT FOR TELECOMMUNICATION AND DATA TECHNOLOGY

This application is a National Stage Application of PCT/EP2008/006029, filed 23 Jul. 2008, which claims benefit of Serial No. 10 2007 039 353.0, filed 21 Aug. 2007 in Germany and which applications are incorporated herein by reference. To the extent appropriate, a claim of priority is made to each of the above disclosed applications.

BACKGROUND

The invention relates to a cable device and a device for telecommunications and data technology, with such a cable guide.

Devices for telecommunications and data technology frequently have a multiplicity of connecting strips or printed circuit board plug connectors, to which wires are connected. The contacts are in this case, for example, in the form of insulation-displacement terminal contacts or wire-wrap contacts. Alternatively or additionally, other connection techniques can also be used, such as plug connectors (for example RJ11, RJ45 or coaxial plug connectors). In this case, the devices may have connecting strips, printed circuit board plug connectors and/or plug connectors on only one or on a plurality of faces (for example the front face and rear face). Owing to the requirement for small physical heights and a high connection density, the connecting strips and printed circuit board plug connectors are arranged closely alongside one another and/or one above the other. This leads to the cable guide to the connecting strips and printed circuit board plug connectors being relatively heavy, which is particularly disadvantageous for subsequent jumper-connection or maintenance work.

The invention is therefore based on the technical problem of providing a cable guide as well as a device for telecommunications and data technology, which simplify cable routing.

For this purpose, the cable guide has a mount element with attachment means for attachment of the cable guide to the device, with cable guide elements being attached to the mount element. This means that the cables are routed in a defined manner forwards in front of the connecting strips or printed circuit board plug connectors, where there is generally more space than for cable routing at the side. The cable guide elements can, for example, in this case be pushed or latched onto the mount element and, if required, may also have different sizes and shapes. In this case, it should be noted that, in principle, it is also possible to arrange only one cable guide element on the mount element.

In one preferred embodiment, the mount element is in the form of a U-shaped bracket element with a base part and two limbs, with the limbs having means for attachment to the device, and in which, the distance to the device can be set by means of the length of the limbs.

In a further preferred embodiment, the cable guide elements can be moved on the mount element, so that they can be pushed to any desired position on the mount element.

In a further preferred embodiment, the cable guide elements can be fixed on the mount element. This ensures that the cable guide elements cannot move in an undefined manner during operation. By way of example, they can be fixed by means of latching positions on the mount element, which is formed with appropriate contours. Alternatively, a cable guide element can also be screwed to a dip mechanism on the mount element.

In a further preferred embodiment, the means for attachment are designed such that the mount element can be pivoted through an angle range a in at least one direction. This pivoting capability means that the connecting strips or printed circuit board plug connectors located behind it are still easily accessible. In particular, this creates sufficient space for the use of a tool, for example of a connection tool. The angle range is therefore preferably chosen to be at least sufficiently great that the connecting strip or the printed circuit board plug connectors located behind it is or are freely accessible for a tool.

In this case, it is possible to provide for the mount element to have the capability to be secured in a pivoted position, for example by means of a catch or an additional blocking part.

In a further preferred embodiment, the bracket element has a circular cross section, with the limb being formed with incisions, in the form of annular sections, in the area of the end surfaces.

The housing of the device in this case preferably has an opening for each limb, with one housing wall preferably having a wedge-shaped cross section in the area of the opening. The bracket element is preferably attached to the housing wall on which the connecting strips and/or printed circuit board plug connectors are also arranged. However, embodiments are also possible where the strips are arranged on the front face and the attachment is made to the side surfaces of the housing. In this case, however, the limbs are always at right angles to the housing wall with the strips (ignoring the tilt resulting from their own weight).

In a further preferred embodiment, the opening has a circular area adjacent to which, at the side, there is an elongated area, with the width of the elongated area being less than the diameter of the circular area. In order to attach the bracket element, its limbs are then pressed together in a sprung manner, and the end surface is inserted into the circular opening. When the load is then removed from the limbs, they spring into the elongated areas of the opening, where they are fixed, but can still pivot.

The configuration of the openings of the device can in this case also be used for other mount elements, for example for mount elements curved in a semicircular shape.

The invention will be explained in more detail in the following text with reference to one preferred exemplary embodiment. In the figures:

BRIEF DESCRIPTION OF THE DRAWINGS

FIG. 2 shows a front view of an unpopulated front panel,

FIG. 3 shows a section illustration through the front panel, along the section A-A from FIG. 2, FIG. 3a shows a detailed illustration of the detail E3 from FIG. 3, FIG. 4 shows a plan view of a bracket element, FIG. 5 shows a side view of the bracket element, FIG. 5a shows a detailed illustration of the detail E2 in FIG. 5, FIG. 6 shows a section illustration of the bracket element along a section B-B from FIG. 4, FIG. 6a shows a detail illustration of the detail E1 from FIG. 6, and FIG. 7 shows a side view of the bracket element in the front panel, in a first and a second position.

DETAILED DESCRIPTION

Figure 1:
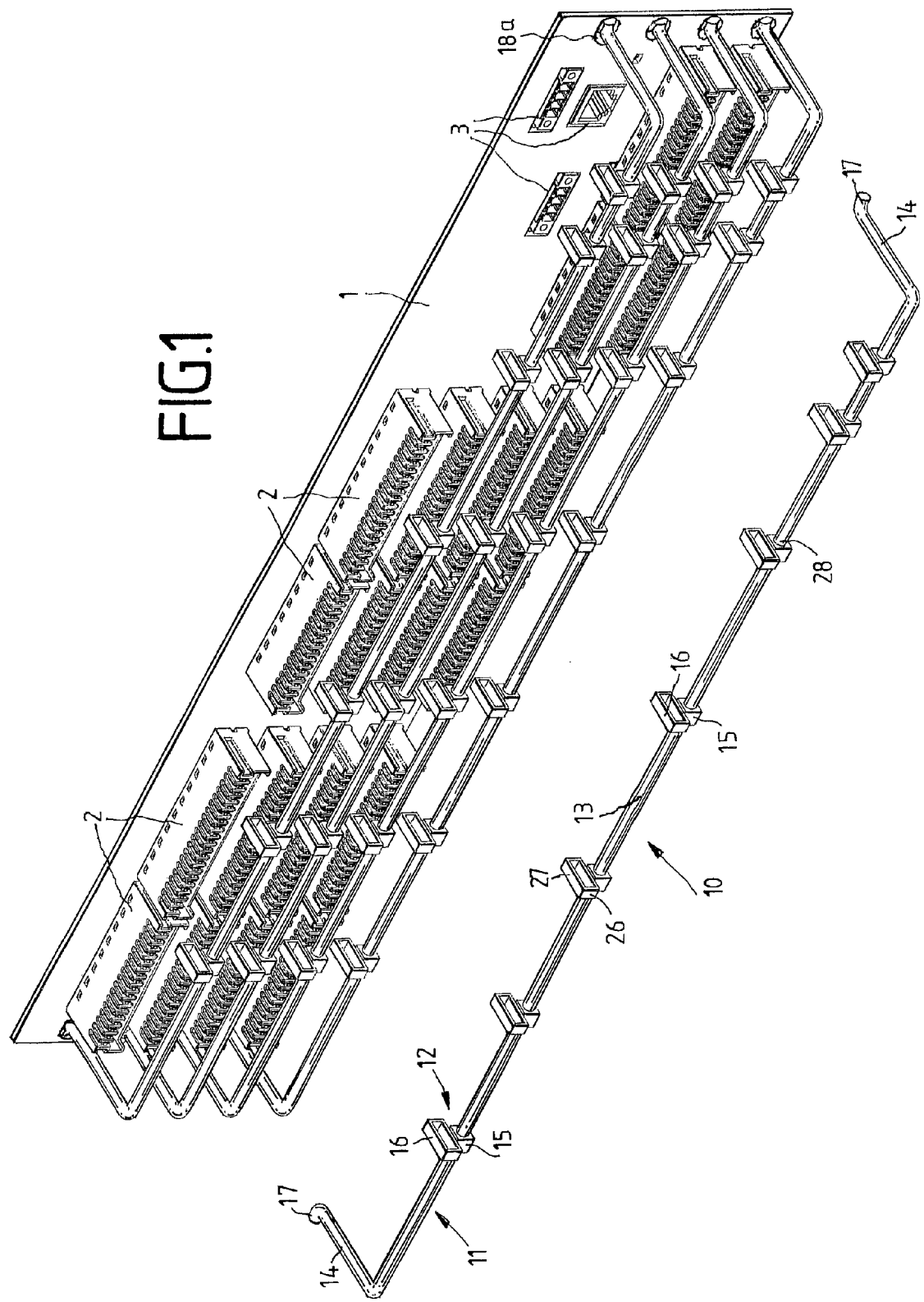
FIG. 1 shows a perspective front view of a front panel with cable guides.

FIG. 1 shows a front panel 1 of a device for telecommunications and data technology, which is fitted with a multiplicity of printed circuit board plug connectors 2. The printed circuit board plug connectors 2 each have a plastic housing with a multiplicity of contact elements, with the contact elements having a contact for a printed circuit board, which is not illustrated, behind the front panel, and a contact for connection of wires. The contact for the printed circuit board is preferably a fork contact, and the contact for the wires is an insulation-displacement terminal contact. Furthermore, further plug connectors 3 are arranged in the front panel 1, via which, for example, voltage can be supplied, programming can be carried out and/or the device can be monitored. Cable guides 10 are arranged in front of the front panel 1 and are arranged on the housing of the device, preferably on the front panel 1 itself. In this case, one cable guide is illustrated pulled out. The cable guide 10 has a U-shaped bracket element 11 and a number of cable guide elements 12. The U-shaped bracket element 11 has a base part 13 and two limbs 14, which originate from the base part 13, approximately at an angle of about 90°. The length of the base part 13 and/or of the limbs 14 is in this case freely variable, and can be matched to the respective device. For example, the illustrated cable guide 10 for one row on the front panel 1 can therefore also be replaced by a plurality of shorter cable guides. The illustrated cable guide elements 12 comprise an upper part 16 and a lower part 15. As shown in FIG. 1, the upper part 16 has a rectangular structure in the form of a frame, with two side surfaces 26 and two longitudinal faces 27. The lower part 15 is integrally connected to the upper part 16, and essentially comprises a rectangular component with a central retaining hole 28, whose internal diameter is at least greater than the external diameter of the base part 13.

The cable guide elements 12 are pushed onto the bracket element 11 by pushing the base part 13 through the retaining holes 28 in the lower parts 15 of the cable guide elements 12, with the side surfaces 26 of the upper parts 16 of the cable guide element 12 in this case being parallel to the front panel 1.

The cable guide elements 12 can be pushed to any desired position of the bracket element, and can also be fixed there. In this case, for example, they can be fixed by means of a screw, which is not illustrated that presses the lower part 15 of the cable guide element 12 together, in a similar manner to a dip. The wires or cables to be guided can then be routed in a defined manner through the upper part 16 of the cable guide element 12. In the illustrated example, the upper part 16 has a closed contour, although embodiments are also feasible where the upper longitudinal surface 27 or one of the side surfaces 26 of the upper part 16 has a slot though which the wires or cables can be pushed into the upper part 16. The cross section of the upper part 16 is in this case matched to the number of wires or cables to be guided, and cable guide elements of different design can also be arranged at the same time on one base part 13. In principle, different contours with one or more slots are feasible for the cable guide element 12. In this case, the cable guide elements 12 are preferably composed of plastic, and the bracket element 11 of metal. At the end remote from the base part 13, the limbs 14 have angles 17 which point outward and represent the attachment means for the cable guide 10 to the front panel 1. These can be plugged into appropriate openings 18a in the front panel 1.

One preferred embodiment of the attachment will now be explained in more detail with reference to FIG. 2 to 7, with FIG. 2 showing a front panel 1 with openings 18. The opening 18 has a circular area 19 and an elongated area 20, with the width B of the elongated area 20 being less than the diameter of the circular area 19. The distance between the two circular areas 19 (centre-to-centre) is in this case somewhat less than the distance between the two limbs 14 (centre-to-centre). FIG. 3 shows the section along the line A-A through the elongated area 20, the front panel 1 having a wedge-shaped cross section in the elongated area 20. The points 21 which are formed are in this case preferably central in the front panel 1 (see FIG. 3a). The distance between the upper and lower points 21 corresponds approximately to the width B. The edges 22, 23 may in this case be positioned at the same angle or at different angles with respect to the walls of the front panel 1.

FIG. 4 shows a plan view of the bracket element 11, whilst FIG. 5 and FIG. 5a show a side view, with the angles 17 being omitted in this embodiment. For this purpose, the limbs 14 have two incisions 25 in the form of annular sections in the area of the end surface 24, as can best be seen in FIG. 6 and FIG. 6a. The incisions 25 in the form of annular sections are located symmetrically with respect to the upper face and lower face, and have an angle $\beta$, where $\beta$ is chosen appropriately as a function of the wall thickness. Segments with an annular cross section or, to be more precise, a cylindrical cross section are therefore cut away (when viewed three-dimensionally). In order to attach the bracket element 11 to the front panel 1, the two limbs 14 are pressed together, and their end surfaces 24 are inserted into the circular area 19 of the openings 18. The limbs 14 are in this case inserted sufficiently deeply that the incisions 25 in the form of annular sections are located in the wall of the front panel 1. When the load is then removed from the limbs 14 which have been pressed together in a sprung manner, they then move into the elongated areas 20. Since this width B is less than the diameter of the circular area 19, and is less than the diameter of the limb 14 as well, the bracket element 11 cannot be pulled, and is secured. On the other hand, the lower incision 25 in the form of an annular section on the limb 14 rests on the lower point 21. The natural weight of the bracket element 11 then tilts it, so that it rests on the lower edge 22. The bracket element 11 can be pivoted using the point 21 as a fulcrum, and can be pivoted upwards from the horizontal or lower position through an angle $\alpha$, as is illustrated in FIG. 7. The entire pivoting range of the bracket element is therefore $2 \cdot \alpha$. This allows the printed circuit board plug connectors 2 located behind it to be connected, if $\alpha$ is chosen appropriately.

LIST OF REFERENCE SYMBOLS

1 Front panel
2 Printed circuit board plug connector
3 Plug connector
10 Cable guides
11 Bracket element
12 Cable guide element
13 Base part
14 Limb
15 Lower part
16 Upper part
17 Angles
18, 18a Openings
19 Circular area
20 Elongated area
21 Points
22, 23 Edges
24 End surface
25 Incisions in the form of annular sections
26 Side surfaces
27 Longitudinal surfaces
28 Retaining hole

The invention claimed is:

1. A cable guide for a device for telecommunications and data technology, comprising:
   cable guide elements; and
   a mount element including two limbs that have attachment means for attachment of the cable guide to the device, with the cable guide elements being attached to the mount element, wherein the means for attachment are configured to enable the mount element to be pivoted through an angle range in at least one direction.

2. The cable guide as claimed in claim 1, wherein the mount element includes a U-shaped bracket element with a base part and the two limbs.

3. The cable guide as claimed in claim 2, wherein the bracket element has a circular cross section, with end surfaces of the limbs being formed with incisions, in the form of annular sections.

4. The cable guide as claimed in claim 2, wherein the bracket element is composed of metal and/or the cable guide elements are composed of plastic.

5. The cable guide as claimed in claim 1, wherein the cable guide elements can be moved on the mount element.

6. The cable guide as claimed in claim 1, wherein the cable guide elements can be fixed on the mount element.

7. A device for telecommunications and data technology, comprising:
   a body, with connecting strips or printed circuit board plug connectors being arranged on at least one body side,
   wherein a cable guide is arranged on the body, with the cable guide including a mount element having two limbs, which have attachment means for attachment of the cable guide to the device, and with cable guide elements being attached to the mount element; and
   wherein the means for attachment to the limbs are designed such that the mount element can be pivoted through an angle range in at least one direction.

8. The device as claimed in claim 7, wherein the mount element is in the form of a U-shaped bracket element with a base part and the two limbs.

9. The device as claimed in claim 8, wherein the bracket element has a circular cross section, with the limb being formed with incisions, in the form of annular sections, in the area of the end surface.

10. The device as claimed in claim 9, wherein the body has an opening for each limb.

11. The device as claimed in claim 10, wherein one body wall has a wedge-shaped cross section in the area of the opening.

12. The device as claimed in claim 10, wherein the opening has a circular area adjacent to which, at the side, there is an elongated area, with the width B of the elongated area being less than the diameter of the circular area.

13. The device as claimed in claim 7, wherein the cable guide elements can be moved on the mount element.

14. The device as claimed in claim 7, wherein the cable guide elements can be fixed on the mount element.

* * * * *